United States Patent
Bae (10) Patent No.: US 6,934,819 B2
(45) Date of Patent: Aug. 23, 2005

(54) METHOD FOR MEMORY ADDRESSING IN MICRO CONTROLLER AND DEVICE USING THE SAME

(75) Inventor: Jong-Hong Bae, Ichon-shi (KR)

(73) Assignee: Hynix Semiconductor Inc., Ichon-shi (KR)

( * ) Notice: Subject to any disclaimer, the term of this patent is extended or adjusted under 35 U.S.C. 154(b) by 299 days.

(21) Appl. No.: 10/261,682

(22) Filed: Oct. 2, 2002

(65) Prior Publication Data

US 2003/0120890 A1 Jun. 26, 2003

(30) Foreign Application Priority Data

Dec. 24, 2001 (KR) ........................................ 2001-84433

(51) Int. Cl.$^7$ ............................................. G06F 12/00
(52) U.S. Cl. ...................................... 711/155; 711/202
(58) Field of Search ............................ 711/2, 154, 155, 711/202, 174

(56) References Cited

U.S. PATENT DOCUMENTS 6,226,730 B1 * 5/2001 Murdoch et al. ........... 711/203
2001/0013082 A1 * 8/2001 Jeddeloh ..................... 711/105

FOREIGN PATENT DOCUMENTS

| KR | 1999-13576 | 2/1999 | ........... G06F/12/08 |
| KR | 2000-42435 | 7/2000 | ............. G06F/9/34 |
| KR | 2000-44549 | 7/2000 | ........... G06F/13/00 |

* cited by examiner

*Primary Examiner*—Matthew Kim
*Assistant Examiner*—Woo H. Choi
(74) *Attorney, Agent, or Firm*—Mayer, Brown, Rowe & Maw LLP (57) ABSTRACT

In a memory within a micro controller, a method for addressing a page for inputting and outputting the page data on a bus. The method includes steps of producing a first control signal activated at a data update mode in which a read or write operation is executed, and determining in response to the first control signal whether the read or write operation is executed for the same page or a different page.

9 Claims, 8 Drawing Sheets

METHOD FOR MEMORY ADDRESSING IN MICRO CONTROLLER AND DEVICE USING THE SAME

FIELD OF THE INVENTION

The present invention relates to a micro controller and, more particularly, to a method for memory addressing in a micro controller and a device for page mapping by using the same.

DESCRIPTION OF RELATED ART

Presently, 8/16-bit micro controllers are commonly used for controlling a system. When architecture of an 8/16-bit micro controller is initially selected, an address area is fixed to 8/16 bits. The maximum address data, which can be used at the 8/16-bit address area, are 64 k/126 k bytes. Thus, a method for efficiently extending the memory is required for application fields using lots of memory.

A memory area of a general micro controller will be described with reference to the 80C52 memory of Intel Corporation.

Figure 1:
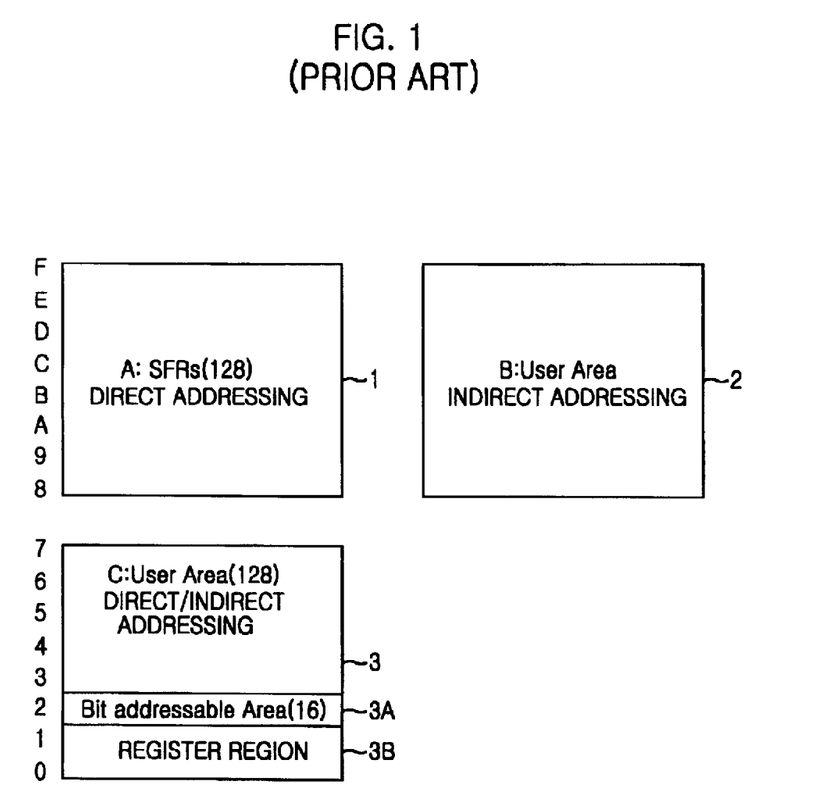
FIG. 1 is a block diagram illustrating a memory configuration of a micro controller according to the prior art.

FIG. 1 is a bock diagram illustrating the internal data memory configuration of the 80C52 memory manufactured by Intel Corporation.

Referring to FIG. 1, the memory area may be classified into three areas. The memory area of the micro controller includes: a first area 1, in which a register used for controlling the operation of the micro controller is placed; a second area 2, which a user can optionally use; and a third area 3, which includes a register region and a bit memory region for easy programming and reducing the size of program codes.

The first area 1, generally known as a SFR (special function register) region, is positioned at an address range of 80h to ffh and stores various kinds of setting data necessary for the operation of the micro controller. The first area 1 is accessed only by direct addressing mode, with an operand of an instruction being directly used as an address.

The second area 2, which is a general memory area, is positioned at an address range of 80h to ffh and has a size of 128 bytes. The second area 2 is accessed only by indirect addressing mode, in which an operand of an instruction becomes an address of an address for accessing data. The direct addressing mode and the indirect addressing mode are determined by instructions.

The third area 3, which is a general memory region, is positioned at an address range of 00h to 7fh and has a size of 128 bytes. Both direct addressing mode and indirect addressing mode can be used as an access way and the addressing of a bit unit may be performed by the instructions at the address region 3A from 20h to 2fh in the third region. Also, the address region 3B from 00h to 1fh in the third area 3, which is 32 bytes, may be assigned as a register region. The register region may be named as a coded register such as R0 to R7. When compared with the general memory operation, which transmits data by calling the address of a corresponding memory, it has advantages of easy programming and smaller operand size.

The register region 3B includes four register banks of 8 byte unit and each bank has eight registers from R0 to R7.

At this time, a memory access operation and a register access operation are performed as determined by the instructions.

For example, when the data stored in address 31h is added to an accumulator of the micro controller, which is generally represented with the symbol 'A', the instruction is expressed in assembly language as 'ADD A, 31h ' and 'ADD A, R0' by the register.

Data stored in 'R0' is identical to that stored in the address '31h '. Therefore, it is simpler to use the register rather than generate instructions by referring to addresses.

A method for extending the memory region based on the above memory structure will now be described.

Figure 2:
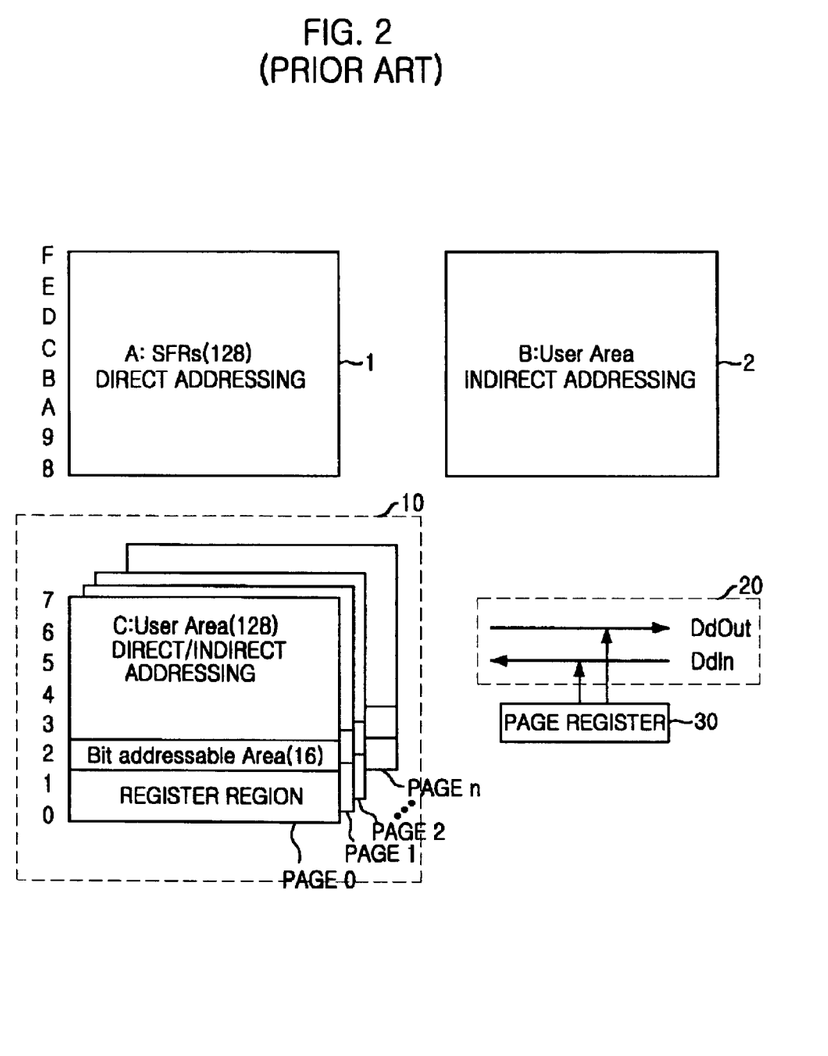
FIG. 2 is a block diagram illustrating a memory configuration extending a memory area with a page unit according to the prior art.

FIG. 2 is a block diagram illustrating a memory structure extending the memory area with a page unit according to the prior art.

Referring to FIG. 2, the memory structure includes a page memory unit 10 which divides the third region into a plurality of pages, a data bus for inputting/outputting data into the page memory unit 10 and a page register 30 for accessing a specific page by controlling the data bus unit 20.

As the page memory unit 10 is applied to the third area capable of applying the direct/indirect addressing modes, the first area applying only the direct addressing mode and the second area applying only the indirect addressing mode can be accessed from all pages, 0 to n, in the page memory unit 10.

In order to access the extended memory region 10, after referring to the page register 30 and decoding data in the page register 30, the corresponding page is read or written. Namely, the third area 3 fixed to 128 bytes in FIG. 1 can be efficiently extended.

However, since each page can have a register region, each page may access a register region of a different page. When accessing the register region positioned in each page, the register region must have the data from the corresponding page number to access the register region in the corresponding page. Thus, the programming work becomes inefficient.

Figure 3:
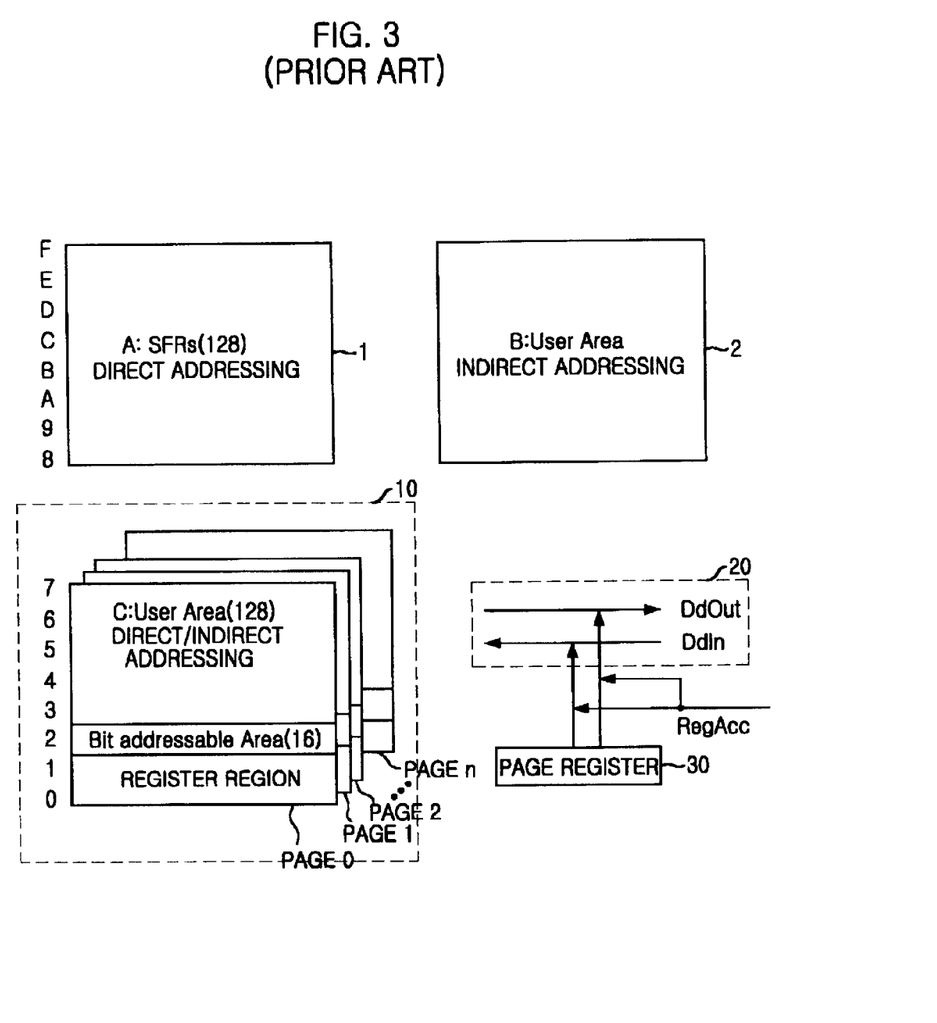
FIG. 3 is a block diagram illustrating an improved memory configuration according to the prior art.

FIG. 3 is a block diagram illustrating a prior art memory structure improved from the memory structure shown in FIG. 2.

Referring to FIG. 3, the memory structure is similar to that of FIG. 2. The only difference is the control signal RegAcc is applied between the page register and the data bus 20. When the control signal RegAcc is enabled, the register region is mapped to the page (page 0) for accessing the register region.

However, the memory structure has a problem; it must frequently update the page register 30 whenever data are transmitted with a block unit between each page.

Figure 4:
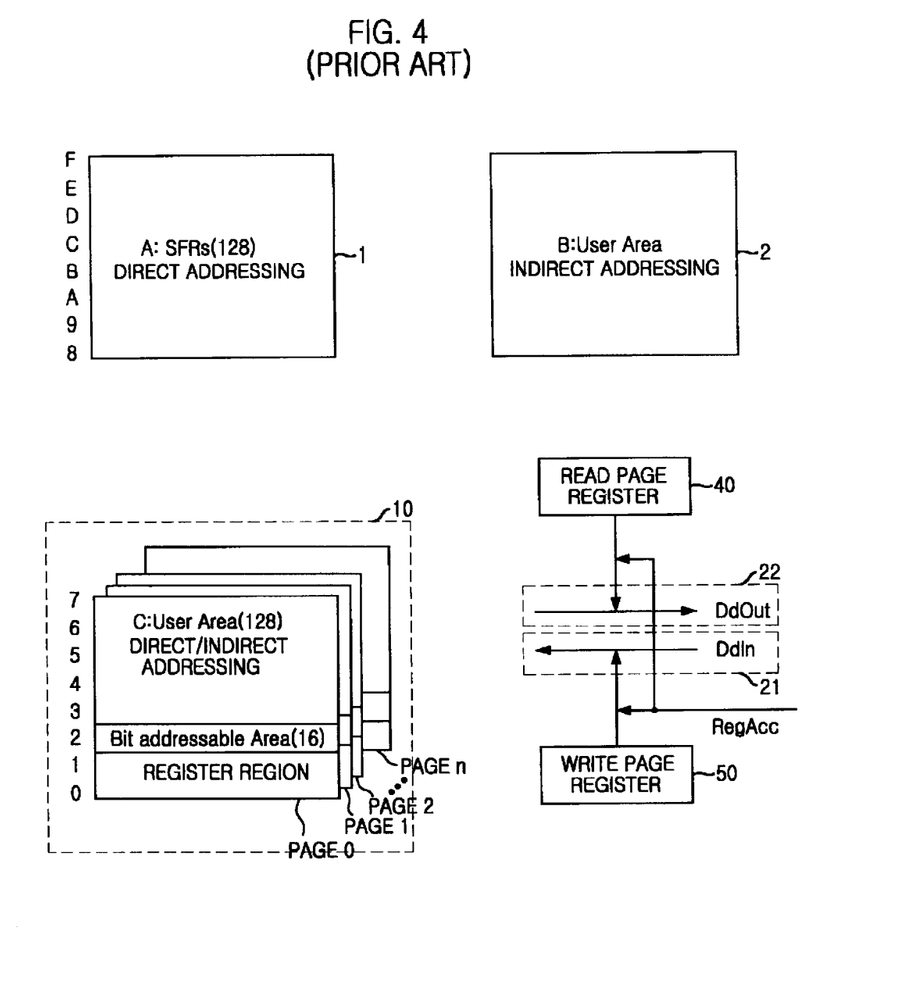
FIG. 4 is a block diagram illustrating another improved memory configuration according to the prior art.

FIG. 4 is a block diagram illustrating a memory structure improved from the memory structure of FIG. 3 according to the prior art.

Referring to FIG. 4, the memory structure includes a page memory unit 10 dividing the third region into a plurality of pages, a write data bus 21 inputting data into the page memory unit 10, a read data bus 22 outputting data from the page memory unit 10, a read page register 40 registering a corresponding page when the data from the page memory unit 10 is outputted and a write page register 50 registering a corresponding page when the data is inputted into the page memory unit 10.

When data are transmitted with a block unit between different pages, if page 1 transmits data and a page 2 receives data, data are read in page 1 and written on page 2. After the control signal RegAcc is disabled to access every page, the read page register 40 is set to register page 1 and the write page register 50 is set to register page 2. While page 1 outputs data into the read data bus 22, page 2 receives data from the write data bus 21.

When referring the register, page 0 is accessed only and the read/write operations in data transmission of a block unit between different pages are simultaneously carried out so that the number of times to access the read page register 40 and the write page register 50 can be reduced.

Figure 5:
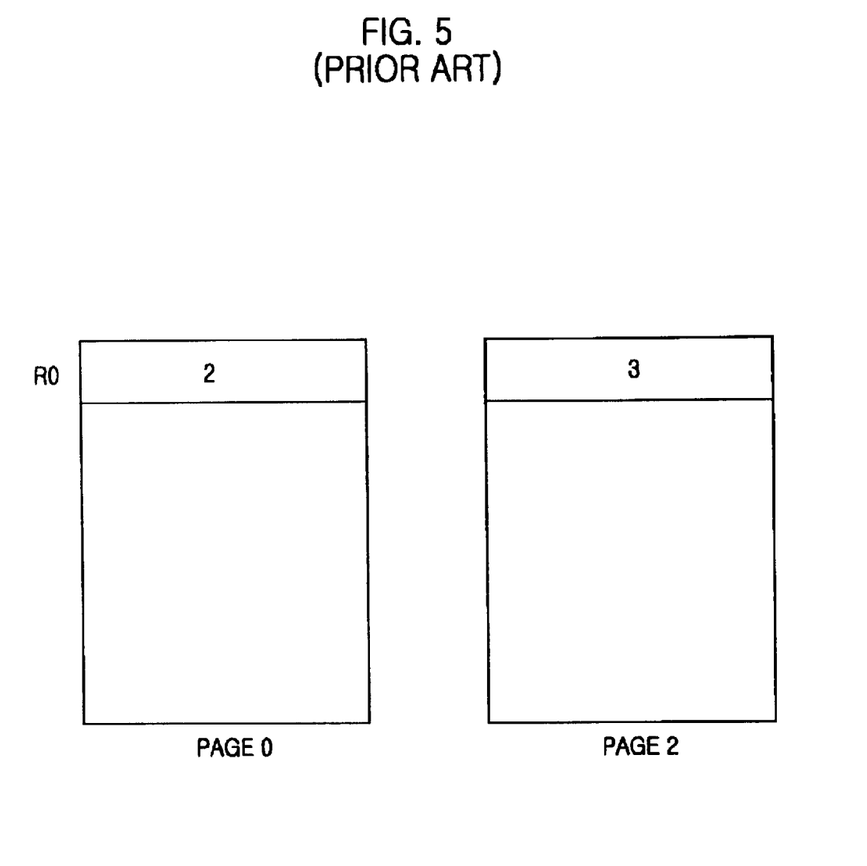
FIG. 5 is a schematic block diagram for explaining an operation of FIG. 4.

Referring to FIG. 5, a problem generated when the read page and the write page of FIG. 4 are different from each other will be described.

Register R0 exits in page 0 and the decimal value of register R0 is 2. If an operation of adding 1 to the register R0 is carried out until the decimal value of register R0 becomes 100 and the result of the operation is stored at 2 of page 0 in FIG. 5, page 2 always stores the number 3.

Accordingly, the register R0 has to be repeatedly updated by adding one in order for the decimal value of the register R0 to be 100. However, since the page reading data and the page writing data are different from each other, page 0 is not updated. Therefore, a correct operation result is not expected.

SUMMARY OF THE INVENTION

It is, therefore, an object of the present invention to provide a page mapping device applying memory addressing method to a micro controller.

In accordance with an aspect of the present invention, there is provided a micro controller with memory which includes: a first area in which only direct addressing is available, a second area in which only indirect addressing is available and a third area in which both direct and indirect addressing are available, the third area having a plurality of pages, a method for addressing a page for inputting and outputting page data on a bus. The method comprises the steps of producing a first control signal activated at a data update mode in which a read or write operation is executed; and determining in response to the first control signal whether the read or write operation is executed for a same page or a different page.

In accordance with another aspect of the present invention, there is provided a micro controller with memory which includes a first area in which only direct addressing is available, a second area in which only indirect addressing is available and a third area in which both direct and indirect addressing are available, the third area having a plurality of pages, a device for addressing a page for inputting and outputting the page data on a bus. The device comprises: a control signal generating means for generating a first control signal activated when the page having a specific region is accessed and for activating a second control signal when a data update mode is executed to update a region; a page selection means coupled to the bus for selecting the page having the specific region enabled by the first control signal; and a multiplexing means using address signals of the page, which is read out by the second control signal, as address signals of the page to be written.

BRIEF DESCRIPTION OF THE DRAWINGS

The above and other objects and features of the instant invention will become apparent from the following description of preferred embodiments taken in conjunction with the accompanying drawings, in which.

DETAILED DESCRIPTION OF THE INVENTION

Hereinafter, a method for memory addressing in a micro controller and a page mapping device using the same, according to the present invention, will be described in detail referring to the accompanying drawings.

Figure 6:
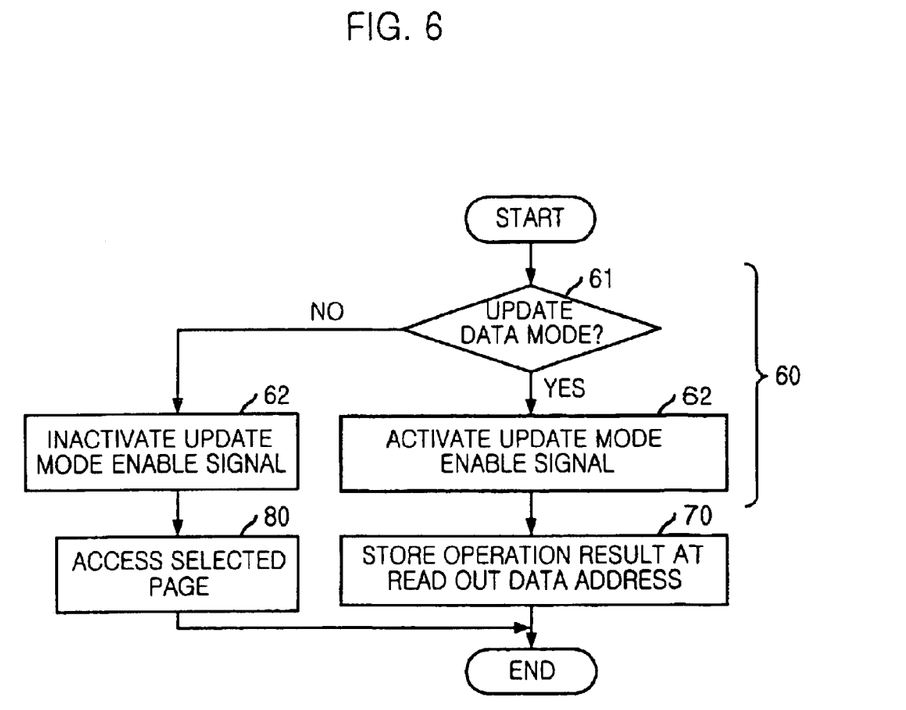
FIG. 6 is a flow chart illustrating a memory addressing method according to the present invention.

FIG. 6 is a flow chart illustrating a memory addressing method according to the present invention.

Referring to FIG. 6, when page data are outputted to a bus or inputted from a bus by expanding a third region in an internal memory of a micro controller having first to third areas, a method for addressing each page of the third area includes steps of generating an update mode enable signal which is enabled in a data update mode performing a read/write operation for the same page at step 60; and determining whether a different page is accessed or the same page is accessed in response to the update mode enable signal at step 70.

The present invention solves the problem generated by the fact that the page for reading data and the page for writing date are different from each other when extending the internal memory area of the micro controller to a plurality of pages. The memory addressing method according to the present invention accesses the expanded memory area as the pages. Namely, the present invention should be applied to a system having a data storing unit, such as a register or the like, which can register the expanded memory region with a page unit and each page.

The update mode enable signal, which is generated at step 60, is generated at step 62 when a specific register has to be updated at step 61.

When the update mode enable signal is enabled, the read/write operations are executed only at one page carrying out the read operation.

The data read out from the page is operated and the read out data are stored to the same page at step 70. When a program requiring data update such as a loop operation is made, an operation error is not generated. When the update mode enable signal is disabled, the page reading data and the page writing data can access different page at step 80.

Figure 7:
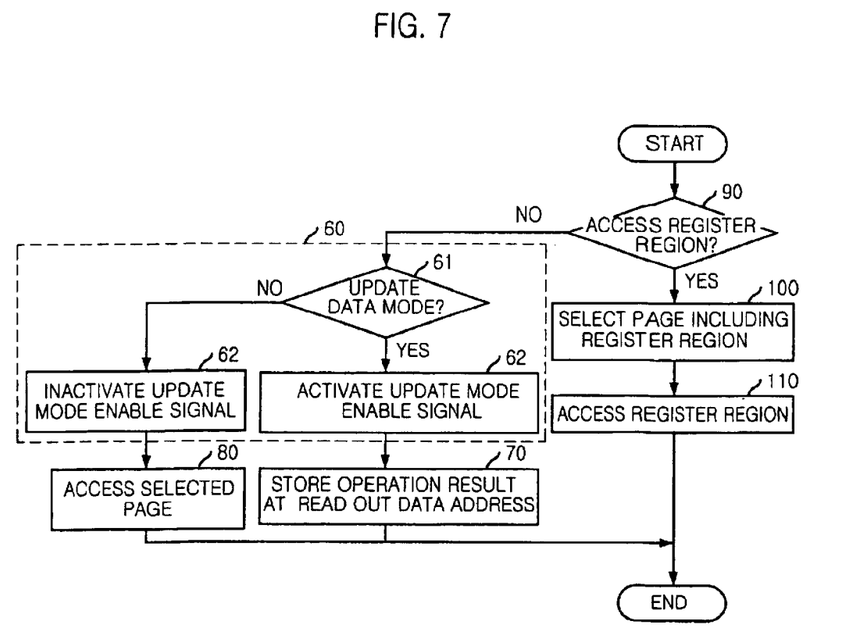
FIG. 7 is a flow chart illustrating another memory addressing method according to the present invention.

FIG. 7 is a flow chart illustrating a memory addressing method adding a method for accessing a register region according to the present invention.

Before the memory of the micro controller is extended, a register bank, a bit address region and a user region coexist in the third area. When the third area is extended into a plurality of pages, the number of times for accessing the page register in order to have each page refer to the same register region is increased, as mentioned above (see FIG. 2).

In FIG. 7, when the applied instruction is analyzed and the instruction refers to the register, the register is accessed only in the page including the register region. The extended page does not generate all register regions respectively. If all the registers are generated, instructions are inputted and outputted many times through the bus to refer to the registers in each page; this is very inefficient.

When the register region is accessed by analyzing the instruction at step 90, it is determined whether the register is accessed by the instruction. If the instruction is to access the register, a page including the register region is selected from among a plurality of pages at step 100 and the register region included in the page is accessed at step 110.

For example, if the third area is extended into eight pages from page 0 to page 7 and the register region is in page 0, when the register region is accessed at page 7, data are accessed at the register region included in page 0. Generally, the register region exists in page 0, however, this can be changed by a micro controller designer.

And, if the register region is not accessed, the data may be processed through the procedure of FIG. 6.

In order to increase an efficiency of the page access operation, the bus of the micro controller is classified into the read bus, which is used in a page read operation, and the write bus, which is used in a page write operation. Also, as the read operation and the write operation are carried out at the same time, the speed of reading/writing the instruction to the page may be increased. Accordingly, the other configuration identical to FIG. 7 is made so that one is used for the read operation and the other is used for the write operation so that the efficiency of data processing may be increased.

Figure 8:
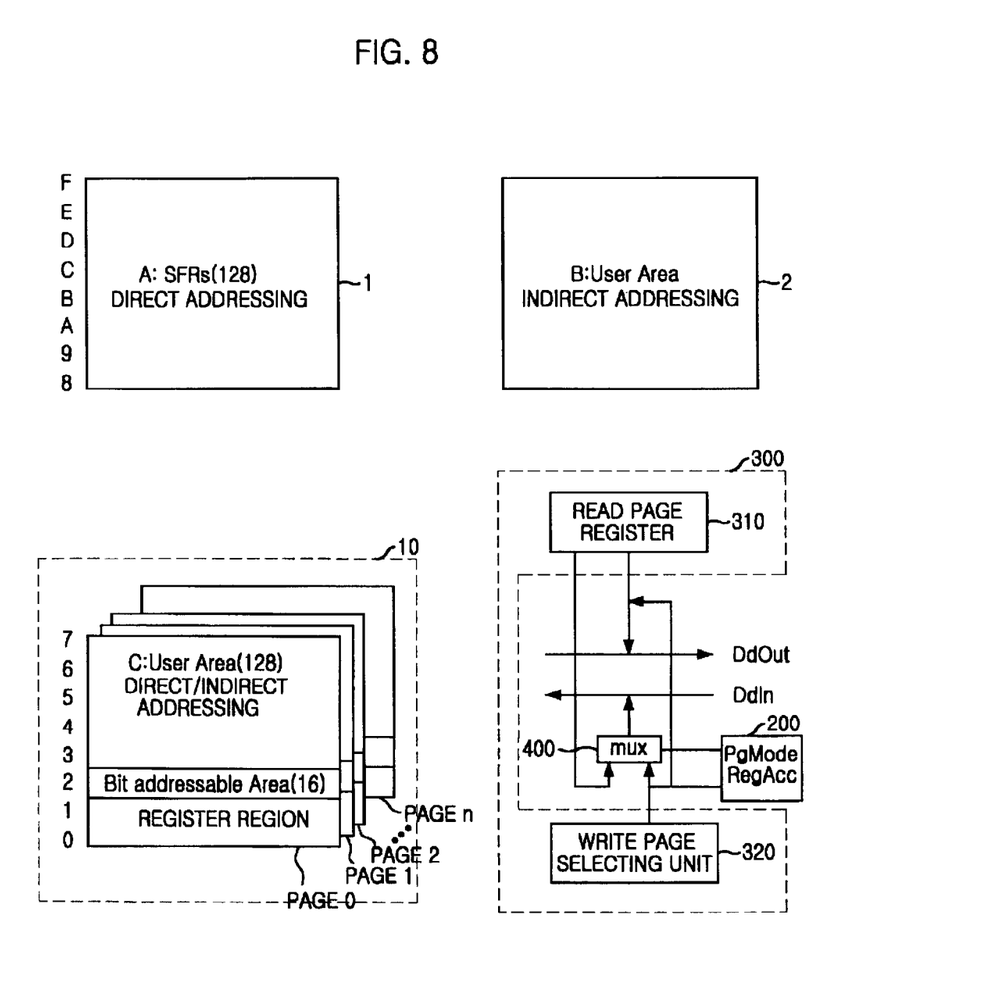
FIG. 8 is a block diagram illustrating a paging mapping device according to the present invention.

FIG. 8 is a block diagram illustrating a page mapping device applying the above method according to the present invention.

Referring to FIG. 8, a page mapping device manages inputting and outputting a page data to a bus by expanding a third area to a plurality of pages. The third area is located at the internal memory of a micro controller. The internal memory of the micro controller has a first area 1 for direct addressing, a second area 2 for indirect addressing and the third area 10 for direct/indirect addressing. The page mapping device includes a page control signal generator 200, a page selector 300 and a multiplexer 400. The page control signal generator 200 generates a register control signal RegAcc and a page control signal PgMode. The register control signal RegAcc is enabled when a page including a specific region is accessed and the page control signal PgMode is enabled when the specific region in a page is accessed and updated. The page selector 300 connects one of the expanded pages to a write/read bus and selects a page containing the specific region when the register control signal RegAcc is enabled. The page selector 300 includes a read page selector 310 for selecting a page for reading and a write page selector 320 for selecting a page for writing.

The multiplexer 400 is operated in response to the page control signal PgMode. The multiplexer 400 uses an address of page read when the register control signal RegAcc is enabled as an address of page for writing. The multiplexer 400 receives an output of the read page selector 310 as an input and receives an output of the write page selector 320 as another input.

Operation steps of the page mapping device are explained below in detail with reference to FIG. 8.

At first, a micro controller receives and analyzes an instruction. If the instruction is an operation for updating data at a same page, necessary operations are performed as follows.

If data of a decimal number 1 is stored at a page 1 and the data is increased five times by decimal number 1 and stored in a page 2, then the page 2 supposes to contain a decimal number 6.

However, the page 2 contains a decimal number 2 since a page for reading is the page 1 and a page for writing is the page 2.

Therefore, if the result of analyzing instruction is an operation for updating data to a same page of the read page, the page control signal generator 200 enables the page control signal PgMode and an address output of the read page register 310 is applied to the multiplexer 400. As a result of above mentioned operations, the data is updated at the read page when writing operation is performed.

In other words, if the micro controller receives an instruction reading stored decimal number 1 at page 1, increasing the decimal number 1 five times by decimal number 1 and storing a result to page 2, then the multiplexer 400 connects a write bus DdIn to page 1 by enabling the page control signal PgMode.

Finally, the error of storing updated data at the wrong page can be eliminated by reading the decimal number 1 from page 1 and updating the result of the calculation to page 1.

The page control signal generator 200 is generally located at a memory, which controls the micro controller and in case of Intel chip 8052, the page control signal generator 200 is implemented at a memory area called the special function register SFR.

It will be described for the case that different pages access the same register by results analyzing instructions transmitted from a code-ROM (not shown), which is built in the micro controller.

It is very inefficient when all pages extending the memory have the register regions, respectively. And, if all pages have the register regions, a problem is generated in that each page has to access the register region of different pages.

As the page control signal generating unit 200 enables the register control signal RegAcc controlling the read page register 310 and the write page register 320, when the register is accessed according to the result of analyzing instructions, a predetermined one page only is accessed.

As the register region exists only in one page among the plurality of pages, when programming, even if the instruction accessing the register is generated, a page, which the register is set, is accessed. If the register control signal RegAcc is disabled, the register region is not accessed so that pages are accessed according to the read/write registers 310 and 320.

When the data are transmitted between the pages with a block unit, the read page register 310 and the write page register 320 controlling the read/write operations are used. A read operation is carried out at the page selected by the read page register 310 and a write operation is carried out at the page selected by the write page register 320.

Accordingly, when the data are transmitted with a block unit, the read page register 310 and the write page register 320 do not have to frequently update and an access speed for the memory area of the memory controller is increased.

While the present invention has been described with respect to the particular embodiments, it will be apparent to those skilled in the art that various changes and modifications may be made without departing from the spirit and scope of the invention as defined in the following claims.

What is claimed is:

1. A method of addressing a plurality of pages included in a memory area of a microcontroller having a read data bus and a write data bus decoupled from each other for performing a read operation and a write operation respectively, only one of the pages having a register region, comprising steps of:

updating a read data read from a page of said plurality of pages;

determining whether it is required to write back said updated read data to said page or to a different page; and generating a first control signal according to a result of the step of determining.

2. The method as recited in claim 1, further comprising steps of:

determining whether it is required to access the register region; and generating a second control signal according to a result of the step of determining whether it is required to access the register region.

3. The method as recited in claim 2, wherein only the one of the pages having the register region is accessed when the second control signal is activated.

4. The method as recited in claim 1, wherein the plurality of pages are separately accessed at the read operation and the write operation.

5. The method as recited in claim 2, wherein the plurality of pages are separately accessed at the read operation and the write operation.

6. A device of addressing a plurality of pages included in a memory area of a microcontroller having a read data bus and a write data bus decoupled from each other for performing a read operation and a write operation respectively, only one of the pages having a register region, comprising:

an updating means for updating a read data read from a page of said plurality of pages;

a control signal generating means for generating a first control signal according to whether it is required to write back the updated read data to said page or to a different page.

7. The device as recited in claim 6, wherein the page selection means includes:

a read page selection means for selecting a page to read data among the plurality of pages; and a write page selection means for selecting a page to write data among the plurality of pages.

8. The device as recited in claim 6, further comprising:

a multiplexing means for accessing the same page at the read operation and the write operation when a second control signal is activated.

9. The device as recited in claim 7, wherein each of the read page selections means and the write page selection means is a readable/writable storing means.

* * * * *